(12) United States Patent
Maguire

(10) Patent No.: US 9,100,861 B2
(45) Date of Patent: *Aug. 4, 2015

(54) SYSTEM AND METHOD FOR ABBREVIATING INFORMATION SENT TO A VIEWING DEVICE

(75) Inventor: Michael Maguire, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 507 days.

This patent is subject to a terminal disclaimer.

(21) Appl. No.: 13/534,591

(22) Filed: Jun. 27, 2012

(65) Prior Publication Data

US 2012/0266064 A1   Oct. 18, 2012

Related U.S. Application Data

(63) Continuation of application No. 11/848,531, filed on Aug. 31, 2007, now Pat. No. 8,239,755, which is a continuation of application No. 09/624,285, filed on Jul. 24, 2000, now Pat. No. 7,302,637.

(51) Int. Cl.
*G06F 3/00* (2006.01)
*H04W 28/06* (2009.01)
*G06F 17/30* (2006.01)
(Continued)

(52) U.S. Cl.
CPC ......... *H04W 28/06* (2013.01); *G06F 17/30905* (2013.01); *H04L 29/06* (2013.01); *H04L 67/04* (2013.01); *H04L 67/2823* (2013.01); *H04L 67/2828* (2013.01); *H04L 67/2842* (2013.01); *H04L 63/0281* (2013.01); *H04L 67/02* (2013.01); *H04L 67/2871* (2013.01); *H04L 69/329* (2013.01); *H04W 28/10* (2013.01); *H04W 88/02* (2013.01); *H04W 88/16* (2013.01)

(58) Field of Classification Search
CPC . G06F 17/30905; G06F 3/017; G06F 3/0485; H04W 28/06; H04W 28/10; H04W 88/02; H04W 88/16; H04L 29/06; H04L 63/0281; H04L 67/2823; H04L 67/2828; H04L 67/04; H04L 67/02; H04L 67/2842; H04L 67/2871; H04L 69/329
USPC .......................... 715/200, 234, 243, 254, 255
See application file for complete search history.

(56) References Cited

U.S. PATENT DOCUMENTS 5,479,602 A   12/1995  Baecker et al.
5,491,760 A    2/1996  Withgott et al.
(Continued)

FOREIGN PATENT DOCUMENTS

EP           0 949 571 A2   10/1999

OTHER PUBLICATIONS

Bickmore et al.: "Web Page Filtering and Re-Authoring for Mobile Users," Apr. 21, 1999, The Computer Journal, vol. 42, No. 6, pp. 534-546.
(Continued)

*Primary Examiner* — Kyle Stork
(74) *Attorney, Agent, or Firm* — Conley Rose, P.C.; J. Robert Brown, Jr.

(57) ABSTRACT

A system and method for transporting user-requested framed data from a gateway device to a handheld viewing device includes an information source, a gateway device, a relay network and a handheld viewing device. The gateway device includes a fetch and cache component, storage, and a wireless transport layer. The wireless transport layer delivers content from the gateway to the handheld viewing device. The user of the handheld device is then graphically presented with a representative form of the data and is thus able to manually select certain frames of data through a user interface.

25 Claims, 3 Drawing Sheets

(51) Int. Cl.
*H04L 29/06* (2006.01)
*H04L 29/08* (2006.01)
*H04W 28/10* (2009.01)
*H04W 88/02* (2009.01)
*H04W 88/16* (2009.01)

(56) References Cited

U.S. PATENT DOCUMENTS

| | | |
|---|---|---|
| 5,765,176 A | 6/1998 | Bloomberg |
| 5,953,541 A | 9/1999 | King et al. |
| 5,973,693 A | 10/1999 | Light |
| 6,593,944 B1 | 7/2003 | Nicolas et al. |
| 6,670,968 B1 | 12/2003 | Schilit et al. |
| 6,675,387 B1 | 1/2004 | Boucher et al. |

OTHER PUBLICATIONS

Johnson: "Converting PC Guis for Non PC Devices," Feb. 1998, Circuit Cellular Ink, vol. 91, pp. 40-42, 44-45.

EPO: European Search Report of European Patent Application No. 01117853.0 dated Nov. 12, 2001 (4 pages).

SYSTEM AND METHOD FOR ABBREVIATING INFORMATION SENT TO A VIEWING DEVICE

CROSS REFERENCE TO RELATED APPLICATIONS

This application is a continuation of U.S. patent application Ser. No. 11/848,531, filed on Aug. 31, 2007, which is a continuation of U.S. patent application Ser. No. 09/624,285 (now U.S. Pat. No. 7,302,637), filed on Jul. 24, 2000. The entirety of these prior applications is hereby incorporated by reference herein.

BACKGROUND

1. Field of the Invention

The present invention relates to the field of data communication over a network. More particularly, the invention provides a system and method for abbreviating the content and quantity of information sent to the viewing device over a network. The information may be an Internet or Intranet world-wide web (WWW) page with Hypertext Markup Language (HTML) coding, XML, or other types of markup languages such as WML that utilize data frames to display information pages. The remote viewing device may be a handheld, laptop, or palmtop device with a limited viewing space for the information being received, and preferably connects to the Internet over a relatively low-bandwidth wireless radio network.

2. Description of the Related Art

Typically, handheld or palmtop devices have very limited viewing surfaces, limited memory capacity, slower processing speeds, and limited user inputs in comparison to large desktop computer systems. These devices may also communicate over a bandwidth-limited data network, such as a wireless packet data network, a cellular network using a digital packet data protocol, or they may use a limited speed modem to download information from a network. For these reasons, it is desirable to limit the data these devices receive over the network or through the modem, particularly when receiving large data files, such as framed web pages that may include text, graphics, animations, multimedia files, or other interactive elements in each frame.

A known method for limiting data transfer to such a viewing device involves restricting the transmittal of graphic information. By providing a specific configuration setting available on most Internet browsers, a user can specify that only text information is fetched by the browser. The graphical portions of the web page are left behind. This method is indiscriminate, however, and leaves the user with little useful control; simply an on or off switch for changing the type of information viewed. In many cases there are pieces of text that are not desired in the information stream, and pieces of graphics that are desired in the information stream, but the user has no control over this situation. For example, in a framed page, a common frame could provide advertisements or a navigational toolbar. Such frames would not be desirable to a user with limited viewing capability and space.

Another known method for transmitting Internet-type information to a wireless viewing device is to "spoof" the Inter-network Protocol (IP) and Transmission Control Protocol (TCP) so that they partially work over the wireless link. This "spoofing" method, however, often leads to a failure of both the protocols and the device to display all the information.

Alternatively, several attempts have been made at using a wireless proxy to eliminate using both TCP and IP over the wireless network. A wireless proxy is a computer that terminates a TCP/IP connection on one end and a wireless connection on the other end. The most common use of a proxy is as a TCP/IP "firewall," which is used in most companies' networks today. This proxy method removes the TCP/IP protocol from running over the wireless network, but leaves the actual data transferred untouched. This type of proxy has limited ability to further limit the higher-level information being sent to the user, and in particular the bandwidth heavy graphics and multimedia files embedded in most web pages.

Still another known method for limiting information sent to a portable viewing device is to have users pre-define the information sites (e.g., web sites) they intend to access using their portable viewing device. In this method, however, a user must pick, ahead of time, every site to be accessed and must select the information to be transferred when connecting with the wireless viewer. This selection is typically done on a desktop computer system, where visibility, memory, CPU speed and keyboard input are not restricted. The challenge for the user, however, is to have foreknowledge of every site to be accessed.

In order to reduce the information contained in frames, a prior art method, shown in FIG. 1, reduces the frame content to simple text that includes a hypertext link. The HTML page 10 includes three frames of information, frame A 12, frame B 14, and frame C 16. According to this method, page 10 is first loaded into a web proxy server. The proxy server interprets the HTML code of page 10 for frame identifiers, such as the tag <frameset>, which is a brief description of the frame. For example, the tag identifiers could be "Title A" for a first frame 12, "Title B" for a second frame 14, and "Title C" for a third frame 16. An abbreviated page 18 including just the tag identifiers is then sent to the viewing device as simple text with a hypertext link to the frame 12, 14, or 16 that the tag represents. The abbreviated page 18 does not display frame content, but only the tag identifier for each of the frames. Thus, the user has no idea of what information content is included in this framed page.

SUMMARY OF THE INVENTION

A system and method for transporting abbreviated information pages from a gateway device to a handheld viewing device is provided that includes an information source, a gateway device, a relay network and a handheld viewing device. The gateway device includes a fetch and cache component, storage, and a wireless transport layer. The wireless transport layer delivers information from the gateway to the handheld viewing device, the gateway device determines whether a particular information page requested by the handheld device includes frames, and, if so, then the gateway device creates an abbreviated version of the information page and transmits it to the handheld device. The abbreviated version of the information page includes a reduced-sized bitmap of the page and an image map that identifies the frame regions within the bitmap. The handheld device displays the abbreviated information page, and a user of the device can then manually select certain frames of data through a user interface.

According to one aspect of the invention, a system is provided that includes a source of information, a gateway device, and a handheld viewing device. The gateway device is coupled to the source of information and is configured to control the flow of information from the source of information to the handheld viewing device. The gateway device controls the flow of information by converting the information into a graphical representation, and a map linked to the format of the graphical representation. The handheld device receives the graphical representation and the map, which is then used to display an interactive representation of the information on the handheld device.

According to another aspect of the invention, a method is provided for sending information from an information source to a handheld device over a network by converting the information into an abbreviated graphical representation. According to this method, information is requested through a wireless device coupled to a host device via the network. The requested information is then received at the host device from the information source. The requested information is then rendered into a standard graphical representation. The rendered information is then abbreviated and transmitted from the host device to the wireless device. The abbreviated information is then displayed on the wireless device.

According to the present invention, there is also provided a computer-readable medium containing instructions for transmitting abbreviated rendered information data to be displayed on a wireless device, comprising the instructions for: receiving information through the wireless device coupled to a host device; receiving the requested information at the host device from an information source; rendering the requested information; abbreviating the rendered information; transmitting the abbreviated rendered information from the host device to the wireless device for displaying on the wireless device.

Further according to the present invention, there is also provided a computer-readable medium containing instructions for displaying abbreviated information data on a wireless device, comprising the instructions for: transmitting information through the wireless device coupled to a host device; receiving the requested information in an abbreviated format at the wireless device from the host device; displaying the requested information in an abbreviated format on the wireless device. Further still, the abbreviated format preferably contains a plurality of image areas and the instructions also provide for: toggling, via an input means on the wireless device, between the plurality of image areas to select an image area; transmitting, from the wireless device to the host device, a second information relating to the selected image area; and, receiving a second requested information at the wireless device from the host device for display on a display screen of the wireless device.

As will be appreciated, the invention is capable of other and different embodiments, and its several details are capable of modifications in various respects, all without departing from the spirit of the invention. Accordingly, the drawings and description of the preferred embodiment are to be regarded as illustrative in nature and not restrictive.

DESCRIPTION OF A PREFERRED EMBODIMENT

Figure 1:
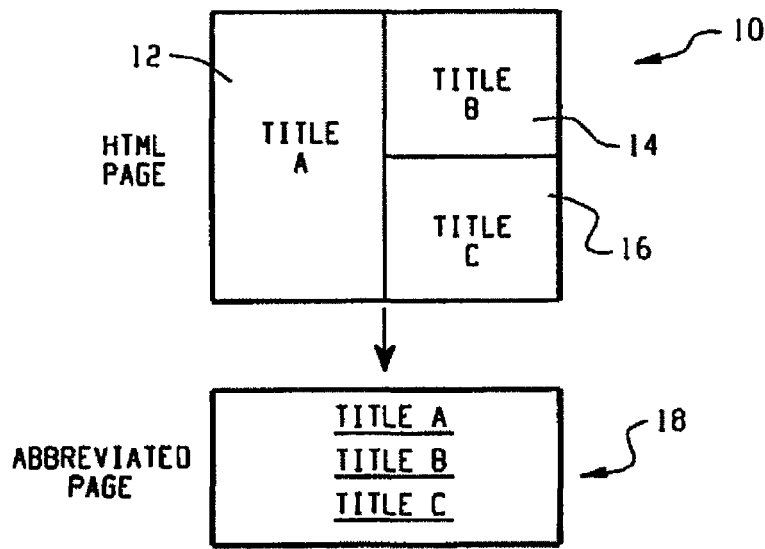
FIG. 1 is a prior art abbreviation method for an HTML page.
Figure 2:
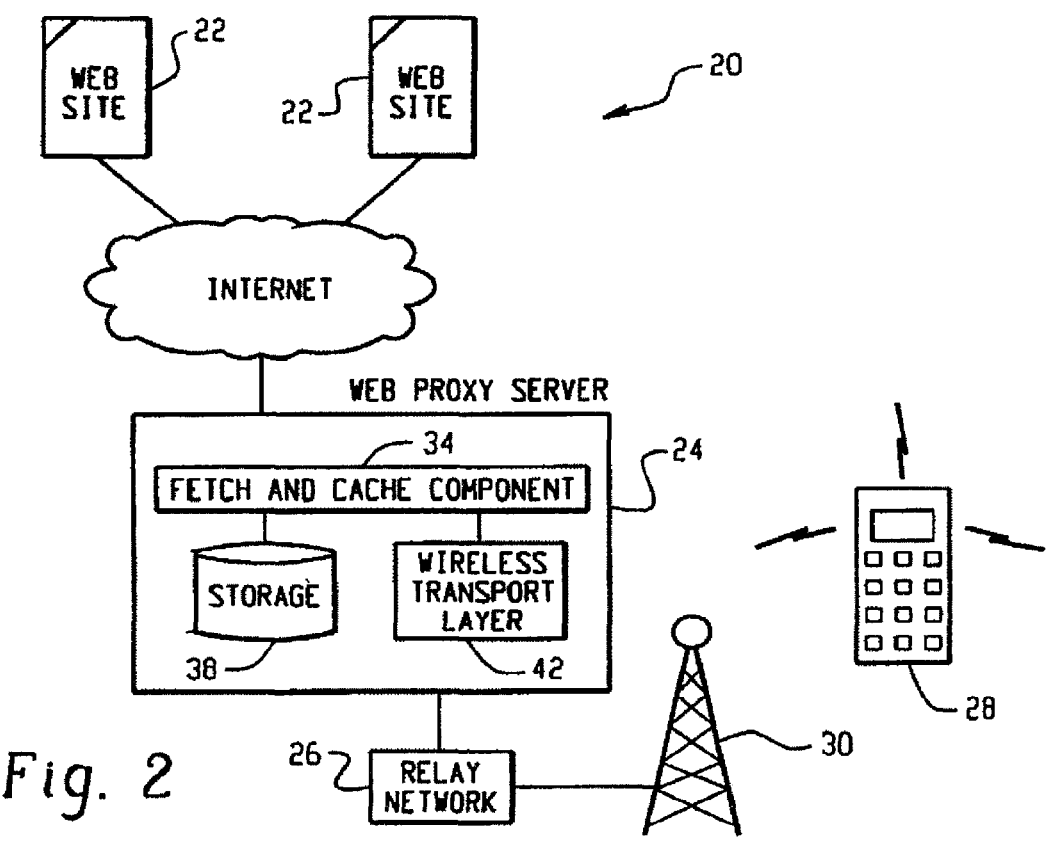
FIG. 2 is a system diagram of a preferred embodiment of the present invention.

Turning now to the drawing figures that depict an example of the present invention, FIG. 2 shows a system diagram of a preferred embodiment of the present invention. A system 20 includes an information source 22, such as a web site coupled to a communication network such as the Internet, a web proxy server 24, a relay network 26, a wireless network 30, and a handheld viewing device 28. The information source 22 could be an Internet site, an Intranet site, or even a local system. The web proxy server 24 is also coupled to the Internet, and communicates information to and from the information sources 22. The relay network 26 couples the web proxy server 24 to the hand held viewing device 28 through a wireless network 30. The viewing device 28 is preferably a wireless handheld device, but could be any other type of device having a limited display screen, such as a cell phone, PDA, laptop, etc.

An example of the handheld device 28 is a BlackBerry™ or Inter@ctive™ two-way Pager manufactured by Research In Motion Limited. This device is further described in co-pending U.S. application Ser. Nos. 09/106,585 and 09/344,432, both titled "Hand Held Messaging Device with Keyboard", and Ser. No. 09/455,211, titled, "Apparatus and Method for Dynamically Limiting Information Sent to a viewing Device." Each of these co-pending applications is commonly assigned to the assignee of the present invention, and the disclosure and teachings of these applications is hereby incorporated into this application by reference.

In this system 20, the web site 22 is a repository of the information that the user of the handheld device 28 desires to access for display. The web proxy server 24 is used as a gateway to accept a connection from the relay network 26, and in turn to make a connection to the web site 22 to retrieve the information desired. Preferably, the connection between the web proxy server 24 and the information source 22 is a TCP/IP connection and the information source 22 is a web server containing a plurality of web pages. As is known in the art, a proxy server accepts a connection request from a device and opens another connection on behalf of the device to allow the device to communicate with other devices or systems indirectly. To assist the web proxy server 24 in its task of obtaining information and preparing it for transmission to the handheld device 28, the web proxy server 24 includes a storage area 38. The storage area 38 can be located on the same machine as the web proxy server 24, in another location across a local area network (LAN), or even in a node cluster of fault tolerant storage devices.

Communication across the wireless network connection 30 is facilitated on the handheld device 28 by software operating within the handheld device 28. This software converts requests from the user into signals that are transmitted across the wireless network connection 30 and understood by the web proxy server 24.

The web proxy server 24 is coupled to, and communicates with the target web site 22 through a Hypertext Transfer Protocol (HTTP) fetch and cache component 36 of the proxy server 24. The target web pages can be located on a range of computers, computer systems, and networks. For example, the information can be stored in local databases, on an Intranet, or on the Internet. The fetch and cache component 34 of the web proxy server 24 stores the web pages that are returned from the information source 22 in response to the user request. A wireless transport layer 40 at the web proxy server 24 then sends the information over the relay network 26, through the wireless network connection 30 to the viewing device 28.

Figure 3:
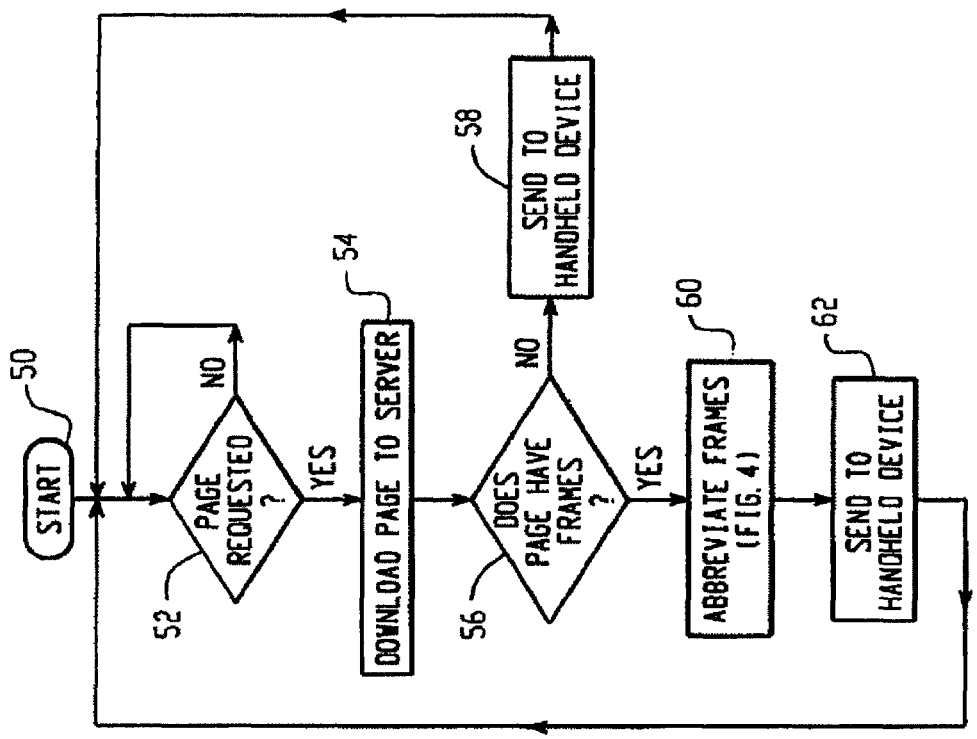
FIG. 3 is a flow diagram of a preferred method for transporting information pages according to the present invention.

Referring now to FIG. 3, a flow diagram of a preferred method for transporting abbreviated information pages is set forth. The method begins at step 50, where the proxy server 24 waits until a request is received 52 from the viewing device 28. Once a page is requested, the page is then downloaded 54 to the web proxy server 24 using the HTTP fetch and cache component 34, and stored in storage 38. The proxy server 24 searches the HTML code that describes the page for frames in step 56. It is to be understood HTML is only used an example in this description, other markup languages are just as applicable such as, but not limited to, XML and WML. If the page does not include frames, then at step 58 the page is sent to the viewing device 28 without an abbreviation. If the page does include frames, then the abbreviated frames method 60 (described more full below with reference to FIG. 4) is executed to form an abbreviated version of the page and the wireless transport layer then sends 62 the abbreviated page to the viewing device 28. The proxy server 24 then waits to receive additional page requests from the handheld device 28.

Figure 4:
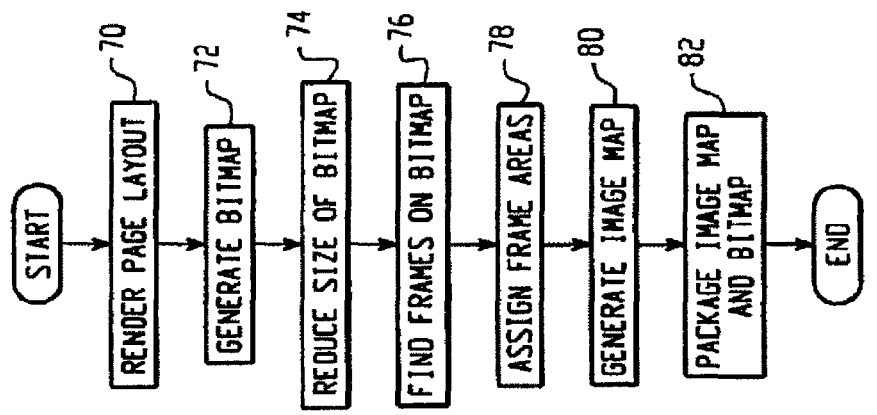
FIG. 4 is a flow diagram of the preferred steps for generating an abbreviated information page according to the present invention.

FIG. 4 sets forth the preferred method for generating abbreviated versions of the information pages having frames. The method begins at step 70 where the proxy server 24 renders the page. The process of rendering preferably includes loading the page into a browser to obtain the placement and proportion of objects, such as frames, as they would appear if loaded to a monitor. Once the page is rendered, then a bitmap is generated at step 72 from the rendered page. Alternatively, other forms of graphical representations could be generated, including compressed forms of representations. The bitmap is a picture version of the rendered page. The bitmap is reduced at step 74 in size from the rendered page to a size that is viewable on the handheld device 28. Such a reduction, could, for example, take a page that would display in 800×600 pixel and reduce it to be viewed in 50×40 pixel resolution.

The proportions of the frames on the rendered page are known, and this proportion is appropriately scaled on the bitmap in step 76. For instance, if a first frame is sized to be 40% of the width of a page and the full length of the page, the accompanying abbreviated frame on the handheld device 28 would be 40% of the width of the viewable area and the entire length of the viewable area. All frames from the information source 22 are similarly reduced to appropriate proportions of the viewable area of the handheld device 28.

Once the frame areas are determined on the reduced bitmap, then the frame areas are assigned 78 to the reduced bitmap. From the assignment of the frame areas, an image map is generated 80. The image map is a reference between the frame areas and the Universal Resource Locators (URLs) that are assigned to each frame. The image map allows a user to choose a point on the bitmap, and then be able to download the particular URL that is associated with that point on the bitmap. The image map and bitmap are packaged together 82 on the web proxy server 24 and sent through the relay network 26 to the viewing device 28 as shown in step 62 of FIG. 3.

Figure 5:
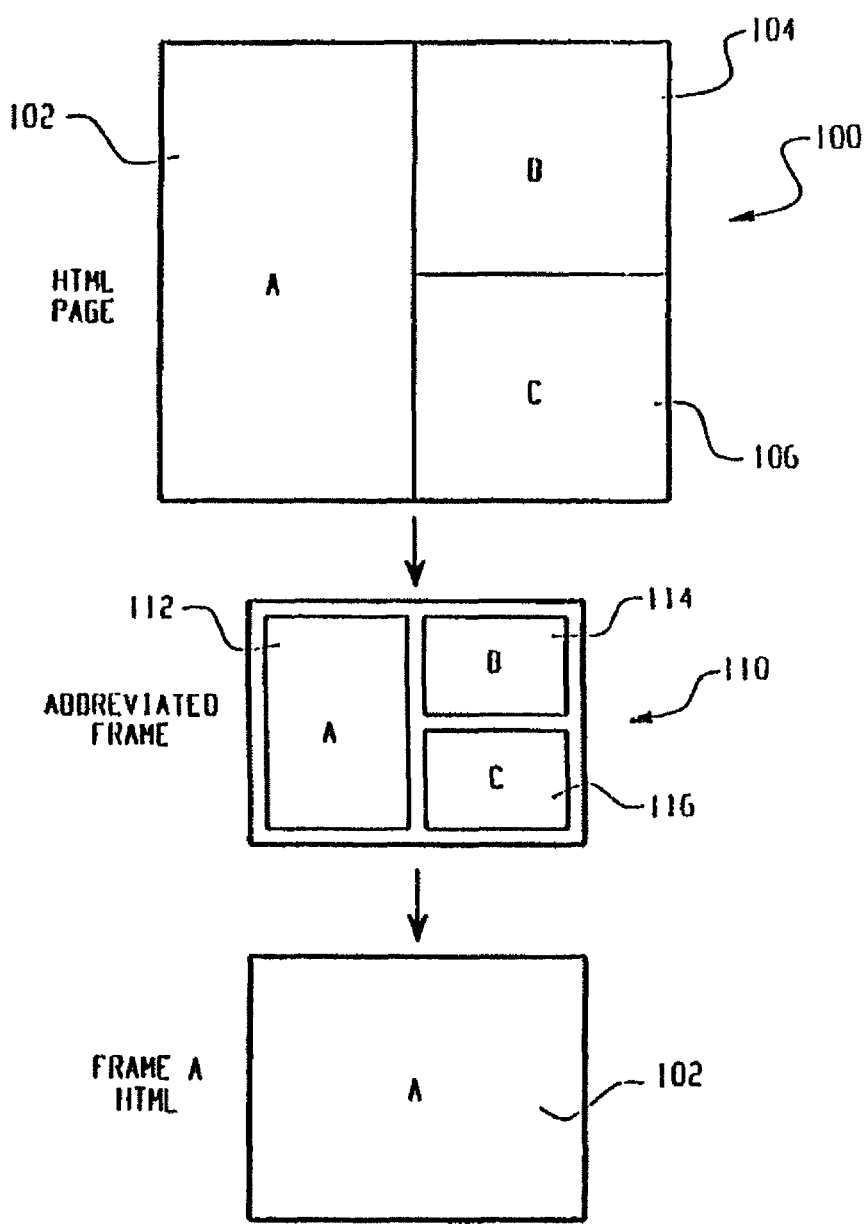
FIG. 5 shows a graphical display for abbreviating an information page and then interacting with the abbreviated page in order to display one frame in the information page.

The abbreviated frame method described in FIG. 4 provides the user of the handheld device with a graphical representation of the content of a framed web page. The bit map reduction gives the user perspective to determine if a particular frame contains pertinent content that the user may want to further examine. As shown in FIG. 5, HTML page 100 shows an example framed web page as it would be rendered on a desktop computer system. The HTML page 100 is divided into three frames: frame A 102, frame B 104, and frame C 106. Frame A 102 could, for instance, be a story that the user might want to read while frame B 104 and frame C 106 could be diversionary frames that contain links and advertisements.

The abbreviated frame 110 would show the bitmap representation of the page 100. The image map for the bitmap would have three defined areas: Frame A area 112, frame B area 114, and frame C area 116. These image areas 112-116 are accessible to the user of the viewing device 28 by input means such as a thumbwheel located on the viewing device 28. The input means would toggle between the image areas 112-116 to allow the user to choose a particular frame on which to focus. Once the user has chosen a particular frame, for instance, frame A 102 of the HTML page 100, the viewing device 28 then requests the web page having the URL associated with frame A 102 from the image map of the abbreviated frames page 112. This selected page is then processed and displayed in the same manner as described in FIGS. 3 and 4. In the event, the selected page does not contain frames, a single page is displayed on the viewing device 28.

The invention has been described with reference to preferred embodiments. Those skilled in the art will perceive improvements, changes, and modifications. Such improvements, changes and modifications are intended to be covered by the appended claims.

I claim:

1. A method of providing graphical information content to a viewing device, comprising:
   retrieving an information page having a plurality of frames from an information source;
   generating an abbreviated version of the information page, the abbreviated version including a graphical representation of the information page and frame location data that associates a plurality of links with the frame locations of the plurality of frames in the graphical representation; and
   transmitting the abbreviated version of the information page to the viewing device.

2. The method of claim 1, further comprising:
   receiving an information page request at a gateway device, which then retrieves the requested information page from a remote system coupled to the gateway device via a wide area network.

3. The method of claim 2, wherein the gateway device receives the information page request from the viewing device via a wireless data network.

4. The method of claim 2, wherein the wide area network is the Internet and the remote system is a world-wide-web server.

5. The method of claim 4, wherein the information page is a web page.

6. The method of claim 5, wherein the plurality of links are Universal Resource Locators.

7. The method of claim 1, further comprising:
   receiving a link request from the viewing device corresponding to one of the plurality of links associated with the frame locations of the plurality of frames in the graphical representation of the requested information page;
   retrieving a graphical representation of the frame associated with the link request; and
   transmitting the graphical representation of the frame to the viewing device.

8. The method of claim 1, wherein the graphical representation is a bitmap file.

9. The method of claim 1, further comprising:
sizing the graphical representation of the information page to match the display characteristics of the viewing device.

10. The method of claim 1, further comprising:
searching the information page to identify the number and location of the plurality of frames.

11. The method of claim 1, further comprising:
rendering the information page into a graphical representation thereof.

12. The method of claim 1, further comprising:
determining the frame areas of each of the plurality of frames in the graphical representation of the information page; and
associating a Universal Resource Locator link to each of the frame areas in the graphical representation.

13. A server comprising a processor for providing graphical information content to a viewing device, the server configured to:
retrieve an information page having a plurality of frames from an information source;
generate an abbreviated version of the information page, the abbreviated version including a graphical representation of the information page and frame location data that associates a plurality of links with the frame locations of the plurality of frames in the graphical representation; and
transmit the abbreviated version of the requested information page to the viewing device.

14. The server of claim 13, wherein the server is a gateway device that is further configured to:
retrieve the information page from a remote system coupled to the gateway device via a wide area network.

15. The server of claim 14, wherein the gateway device is further configured to receive an information page request from the viewing device via a wireless data network.

16. The server of claim 14, wherein the wide area network is the Internet and the remote system is a world-wide-web server.

17. The server of claim 16, wherein the information page is a web page.

18. The server of claim 17, wherein the plurality of links are Universal Resource Locators.

19. The server of claim 13, further configured to:
receive a link request from the viewing device corresponding to one of the plurality of links associated with the frame locations of the plurality of frames in the graphical representation of the requested information page;
retrieve a graphical representation of the frame associated with the link request; and
transmit the graphical representation of the frame to the viewing device.

20. The server of claim 13, wherein the graphical representation is a bitmap file.

21. The server of claim 13, further configured to:
size the graphical representation of the information page to match the display characteristics of the viewing device.

22. The server of claim 13, further configured to:
search the requested information page to identify the number and location of the plurality of frames.

23. The server of claim 13, further configured to:
render the requested information page into a graphical representation thereof.

24. The server of claim 13, further configured to:
determine the frame areas of each of the plurality of frames in the graphical representation of the requested information page; and
associate a Universal Resource Locator link to each of the frame areas in the graphical representation.

25. A portable viewing device, comprising:
a transmitter for transmitting an information page request to a remote system where an information page is stored;
a receiver for receiving an abbreviated version of the requested information page in response to the information page request;
a processor for processing the abbreviated version of the information page, the abbreviated version of the information page including a graphical representation of the requested information page and frame location data that associates a plurality of links with frame locations of a plurality of frames in the graphical representation; and
a browser application for displaying the abbreviated version of the requested information page, the browser application configured to receive a request to display one of the plurality of frames in the abbreviated version of the information page, and in response thereto access the frame location data and cause one of the plurality of links associated with the frame location of the requested frame to be transmitted to the portable viewing device.

* * * * *